US009810127B2

(12) United States Patent
Kloeckner et al.

(10) Patent No.: US 9,810,127 B2
(45) Date of Patent: Nov. 7, 2017

(54) EXHAUST GAS POST-TREATMENT DEVICE

(71) Applicant: Robert Bosch GmbH, Stuttgart (DE)

(72) Inventors: Siegurd Kloeckner, Cologne (DE); Christian Alt, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/036,848

(22) PCT Filed: Nov. 12, 2014

(86) PCT No.: PCT/EP2014/074355
§ 371 (c)(1),
(2) Date: May 16, 2016

(87) PCT Pub. No.: WO2015/074926
PCT Pub. Date: May 28, 2015

(65) Prior Publication Data
US 2016/0298518 A1    Oct. 13, 2016

(30) Foreign Application Priority Data

Nov. 22, 2013  (DE) .......................... 10 2013 223 956

(51) Int. Cl.
*F01N 3/00* (2006.01)
*F01N 3/28* (2006.01)
(Continued)

(52) U.S. Cl.
CPC ........ *F01N 3/2892* (2013.01); *B01F 3/04021* (2013.01); *B01F 5/0473* (2013.01);
(Continued)

(58) Field of Classification Search
CPC .......... B01F 2005/0639; B01F 3/04021; B01F 5/0473; B01F 5/0616; F01N 13/1805;
(Continued)

(56) References Cited

U.S. PATENT DOCUMENTS 6,444,177 B1 * 9/2002 Muller ............... B01D 53/8631
422/172
8,082,732 B2 * 12/2011 Nefischer ............... B01D 53/90
60/286

(Continued)

FOREIGN PATENT DOCUMENTS

| DE | 10060808    | 7/2002  |
| DE | 102006011890 | 9/2007  |
| DE | 102008042536 | 4/2009  |
| DE | 102008029110 | 12/2009 |
| EP | 2006017     | 12/2008 |
| FR | 2929326     | 10/2009 |

OTHER PUBLICATIONS

International Search Report dated Feb. 4, 2015, of the corresponding International Application PCT/EP2014/074355, filed on Nov. 12, 2014.

*Primary Examiner* — Jesse Bogue
(74) *Attorney, Agent, or Firm* — Norton Rose Fulbright US LLP; Gerard Messina

(57) ABSTRACT

A device, in particular an exhaust gas post-treatment device, having a pipe, in particular an exhaust pipe, through which a gas flow, in particular exhaust gas of an internal combustion engine, s is guided; having an injection device, associated with the pipe, for metered injection of a fluid medium, in particular exhaust gas post-treatment agent, into the gas flow; and having at least one mixing apparatus that is disposed in the pipe downstream from the injection device and has several air guidance elements disposed in one plane. Provision is made that the plane is oriented at least substantially perpendicularly to an injection direction of the injection device.

8 Claims, 4 Drawing Sheets

(51) Int. Cl.
    *B01F 5/06*          (2006.01)
    *F01N 3/20*         (2006.01)
    *F01N 13/18*       (2010.01)
    *B01F 5/04*          (2006.01)
    *B01F 3/04*          (2006.01)

(52) U.S. Cl.
    CPC .......... *B01F 5/0616* (2013.01); *F01N 3/2066* (2013.01); *F01N 13/1805* (2013.01); *B01F 2005/0639* (2013.01); *F01N 13/1872* (2013.01); *F01N 2240/20* (2013.01); *F01N 2610/02* (2013.01); *F01N 2610/102* (2013.01)

(58) Field of Classification Search
    CPC ............. F01N 13/1872; F01N 2610/02; F01N 2610/102; F01N 3/2066; F01N 3/2892; F01N 2240/20
    See application file for complete search history.

(56) References Cited

U.S. PATENT DOCUMENTS

| | | | |
|---|---|---|---|
| 9,429,058 B2* | 8/2016 | Solbrig | F01N 3/2066 |
| 2007/0205523 A1 | 9/2007 | Kojima | |
| 2010/0107617 A1* | 5/2010 | Kaiser | B01F 3/04049 |
| | | | 60/324 |
| 2012/0043153 A1* | 2/2012 | Wieres | F01N 3/28 |
| | | | 180/309 |
| 2012/0320708 A1* | 12/2012 | Geibel | B01F 3/04049 |
| | | | 366/337 |
| 2014/0133268 A1* | 5/2014 | Cornaglia | F01N 3/2892 |
| | | | 366/337 |
| 2015/0040537 A1* | 2/2015 | Hicks | F01N 3/2066 |
| | | | 60/273 |

* cited by examiner

EXHAUST GAS POST-TREATMENT DEVICE

FIELD

The present invention relates to a device, in particular to an exhaust gas post-treatment device, having a pipe, in particular an exhaust pipe, through which a gas flow, in particular exhaust gas of an internal combustion engine, is guided; having an injection device, associated with the pipe, for metered injection of a fluid medium, in particular exhaust gas post-treatment agent, into the gas flow; and having at least one mixing apparatus that is disposed in the pipe downstream from the injection device and has several air guidance elements disposed in one plane.

BACKGROUND INFORMATION

Conventional devices perform a method for selective catalytic reduction (SCR) has proven successful for decreasing the nitrogen oxides contained in the exhaust gas of an internal combustion engine. In this method nitrogen oxides are reacted together with ammonia in a selective catalytic converter, yielding nitrogen and water. The reducing agent required for catalytic conversion of the nitrogen oxides is carried in the vehicle in a reservoir tank in the form of an aqueous urea solution rather than ammonia, and is injected by way of an injection device into the exhaust gas of the internal combustion engine in order to carry out the desired reaction with the exhaust gas downstream in a catalytic converter. For better mixing of the exhaust gas with the exhaust gas post-treatment agent it is also known to provide, downstream from the metering device, a mixing apparatus having multiple air guidance elements; this apparatus, constituting a static mixer, promotes mixing of the exhaust gas post-treatment agent with the exhaust gas. A corresponding apparatus is described, for example, in German Patent Application No. DE 10 2006 011 890 A1. German Patent Application No. DE 100 60 808 A1 also describes a corresponding mixing apparatus, although it is disposed upstream from the metering apparatus.

SUMMARY

An example device according to the present invention may have the advantage that the liquid medium or exhaust gas post-treatment agent becomes mixed even better with the gas flow so that, in particular, breakup of larger droplets into small droplets, which results in better vaporization of the exhaust gas post-treatment agent, is ensured. The embodiment according to the present invention furthermore prevents droplets from remaining on that side of the enveloping wall of the pipe or exhaust pipe which is located oppositely from the metering device, and resulting in a crystalline deposit. The example device according to the present invention is notable for the fact that the plane in which the air guidance elements are disposed is oriented at least substantially perpendicularly to an injection direction of the injection device. The injection device usually has a main injection direction or injection axis around which an injection cone of the injected exhaust gas post-treatment agent forms. What is achieved thanks to the orientation, perpendicularly to this injection direction, of the plane in which the air guidance elements are disposed is that the impact surface for the injected medium is enlarged as compared with a conventional mixing apparatus. Increased breakup into smaller droplets of large droplets impacting the air guidance elements thereby occurs. The consequence is an increase in the vaporization rate of the liquid medium and thus better blending of the introduced medium with the gas flow. At the same time, the volume of droplets that pass by the mixing apparatus without coming into contact with it is reduced. Furthermore, fewer droplets impact that side of the enveloping wall of the tube which is located oppositely from the injection device, since the result of the orientation of the plane obliquely in the exhaust pipe is that the air guidance elements extend into this region as well. The risk of crystalline deposits is therefore decreased, and the service life of the device or exhaust gas post-treatment device is extended. The enveloping wall of the pipe preferably has an elevated surface roughness at least on the side located oppositely from the metering device, contributing to a decrease in or avoidance of crystalline deposits.

According to an advantageous refinement of the present invention, provision is made that the air guidance elements are embodied in vane-like fashion and are disposed in at least substantially radially oriented fashion with a distribution around the circumference of the pipe. Seen in a plan view or in the flow direction toward the mixing apparatus, the mixing apparatus thus exhibits a propeller-like structure. The radially oriented air guidance elements produce an advantageous mixing of the exhaust gas post-treatment agent with the exhaust gas, resulting in corresponding advantages in terms of exhaust gas post-processing.

Provision is furthermore preferably made that the air guidance elements are oriented at least substantially obliquely with regard to the flow direction of the gas flow in the pipe upstream from the mixing apparatus. This results, in conjunction with the radial disposition, in the introduction of a swirl into the exhaust gas so that mixing is further optimized.

Preferably the air guidance elements are twisted along their respective at least substantially radially oriented longitudinal axis. Different impact angles against the respective air guidance element are thereby offered, the impact angles being optimally adjustable, thanks to the twist, to the gas flow as a function of radial position in the pipe.

According to an advantageous refinement of the present invention, provision is made that the air guidance elements are at a radial distance from the enveloping wall of the tube. Thermal decoupling of the air guidance elements from the enveloping wall of the tube is thereby produced, and the gas flow flows through the remaining gap. What is thereby achieved is that during operation, the air guidance elements are continuously heated by the exhaust gas flow but the introduced heat is not dissipated again via the enveloping wall of the pipe. Preferably some, particularly preferably all air guidance elements are disposed with a radial spacing from the enveloping wall of the pipe so that an annular gap is produced between the air guidance elements and the enveloping wall. The mixing behavior, in particular the breakup and vaporization of the droplets, is further optimized by the continuous heating and the low heat dissipation.

According to a preferred embodiment provision is further made that the air guidance elements are disposed on a support element disposed at least substantially centeredly in the pipe. The disposition and, in particular, fastening of the air guidance elements on this centeredly disposed support element makes it possible, for example, to implement in simple fashion the above-described radial spacing with respect to the enveloping wall.

The support element is preferably embodied as a tubular element on whose tube wall the air guidance elements are disposed projecting inward. According to this embodiment provision is thus made that the air guidance elements are connected externally to the tubular element, the inward-facing ends of the air guidance elements preferably being embodied in free-standing fashion or alternatively being connected to one another. Provision is particularly preferably made in this context that the diameter of the tubular element is selected to be smaller than the diameter of the exhaust pipe such that there remains between the two an annular gap through which the exhaust gas continuously flows during operation, leading to the advantages already recited above regarding continuous heating of the mixing apparatus. Preferably the tubular element has radially outwardly projecting spacers that, for example, can be embodied integrally with the tubular element and that ensure positioning of the tubular element in the pipe.

According to an alternative embodiment of the present invention, provision is made that the support element is embodied as a tubular element on whose enveloping wall the air guidance elements are disposed, facing outward toward the enveloping wall of the exhaust pipe. The tubular element has a very small diameter in relation to the diameter of the exhaust pipe. The tubular element is preferably carried by a support element that preferably projects perpendicularly into the exhaust pipe and is disposed downstream from the air guidance elements.

According to a preferred refinement of the present invention, provision is made that the air guidance elements are embodied integrally with the tubular element. In the context of preferred manufacture of the tubular element or of a mixing apparatus from a planar stamped part, air guidance elements can be brought into the position and orientation desired according to the present invention by bending, resulting in low production costs and simple assembly. The tubular element itself can be inserted in precisely fitting fashion into the tube, and held in position in the tube preferably by formation of a press fit or by way of separate holding element.

Provision is furthermore preferably made that at least two mixing apparatuses are disposed in the exhaust pipe downstream from the injection device, located one behind another in a flow direction. At least the mixing apparatus located upstream is embodied according to the present invention. According to a first embodiment, the air guidance elements of the second mixing apparatus are preferably disposed in a plane parallel to the plane of the mixing apparatus located upstream. Alternatively, provision is preferably made that the air guidance elements of the mixing apparatus located downstream are disposed at a less steep angle, more parallel to the axis, with respect to the pipe. Particularly preferably the air guidance elements of the mixing apparatus disposed downstream lie in a plane that is oriented perpendicularly to the center axis of the exhaust pipe. The risk of crystalline deposits is further reduced by the provision of two mixing apparatuses or of the two-stage mixer, since thanks to the at least two-stage mixer even more droplets are prevented from impacting against that side of the enveloping wall of the pipe which is located oppositely from the metering device.

The present invention is explained in further detail below with reference to exemplifying embodiments.

DETAILED DESCRIPTION OF EXAMPLE EMBODIMENTS

Figure 1:
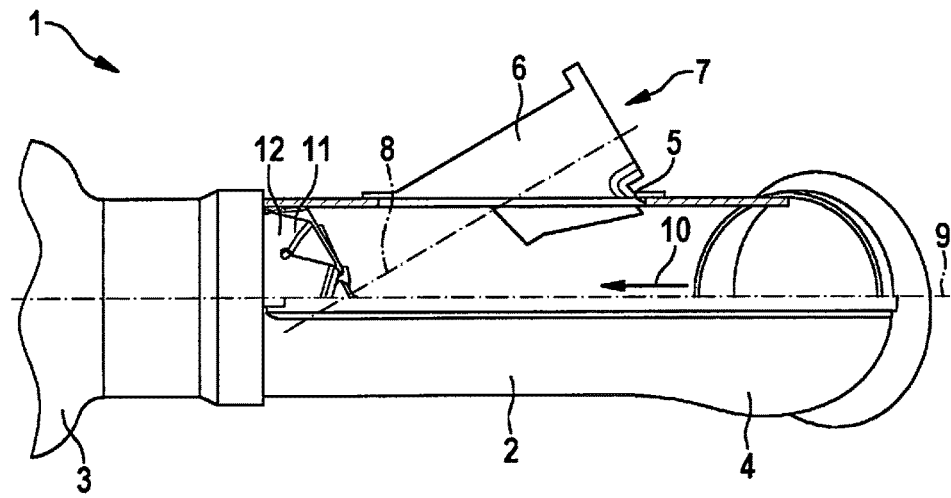
FIG. 1 is a simplified sectional depiction of an exhaust gas post-treatment device.

FIG. 1 is a simplified side view of an exhaust gas post-treatment device 1 for the internal combustion engine of a motor vehicle. Exhaust gas post-treatment device 1 has an exhaust pipe 2 through which exhaust gas of the internal combustion engine is guided to a catalytic converter 3. Exhaust pipe 2 is depicted here in section. On its side of enveloping wall 4 of exhaust pipe 2 is located at the top in the drawing, exhaust pipe 2 has an opening 5 that is covered by a flange 6 of an injection device 7 (not depicted here in further detail). Injection device 7 has an injection direction that is indicated by an axis 8 in FIG. 1. The axis is oriented obliquely with regard to longitudinal axis 9 of exhaust pipe 2 so that exhaust gas post-treatment agent, in particular an aqueous urea solution, that is injected through injection device 7 is injected obliquely into exhaust pipe 2 in a flow direction of the exhaust gas, as indicated by an arrow 10.

Also disposed in exhaust pipe 2 downstream from injection device 7 is a mixing apparatus 11 that serves to influence the flow of the exhaust gas and of the injected exhaust gas post-treatment agent in such a way that the exhaust gas and the exhaust gas post-treatment agent become advantageously and optimally mixed or blended with one another so that a desired reaction can be carried out in catalytic converter 3 located farther downstream.

Figure 2:
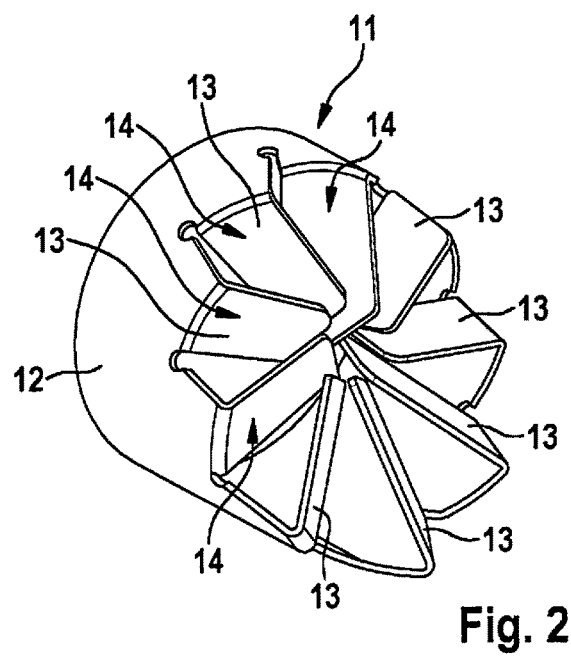
FIG. 2 is a perspective depiction of a mixing apparatus of the exhaust gas post-treatment device.
Figure 3:
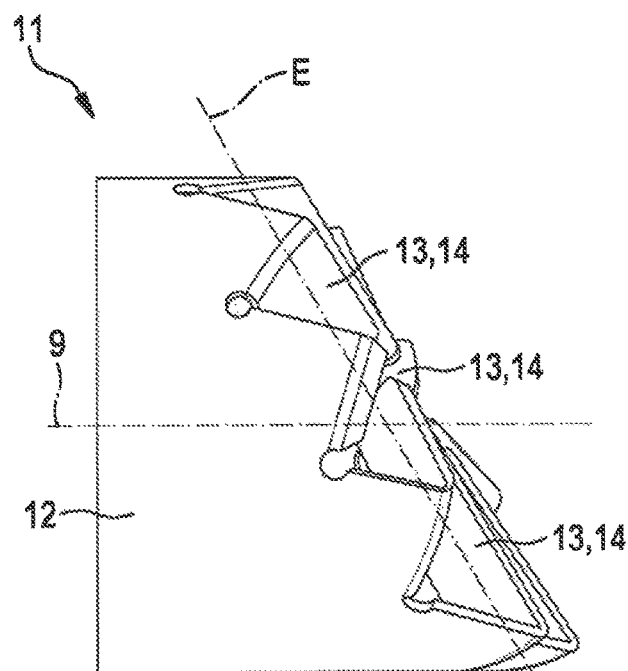
FIG. 3 is a side view of the mixing apparatus.

FIGS. 2 and 3 show a first exemplifying embodiment of mixing apparatus 11 in a perspective depiction (FIG. 2) and in a side view (FIG. 3). Mixing apparatus 11 has a tubular element 12 whose outside diameter corresponds at least substantially to the inside diameter of exhaust pipe 2. Particularly preferably, the diameters are selected in such a way that a press fit is constituted between tubular element 12 and exhaust pipe 2. Tubular element 12 is shaped from a planar stamped part. At its end face facing toward injection device 7, tubular element 12 has multiple tabs 13, disposed with uniform distribution around the circumference, that are each bent radially inward and in the present case each have the same length. The bending points of the tabs are disposed in such a way that the tabs are disposed in a plane E that is oriented obliquely with respect to axis 9 and in particular perpendicularly to axis 8, i.e., perpendicularly to the injection direction of injection device 7. Tabs 13 are disposed with a spacing from one another and are embodied in vane-like fashion so that they form air guidance elements 14. Those tabs 13 located farther in front in the exhaust pipe in a flow direction, and those tabs 13 located somewhat farther back in a flow direction, are preferably embodied to be somewhat longer than the tabs 13 disposed at half-height, so that tabs 13 at the center have substantially the same spacing from one another at their tips.

Because air guidance elements 14 are all disposed in plane E, the impact surface for the injected exhaust gas post-treatment agent ends up being larger as compared with conventional mixing apparatuses, and an increased breakup of large droplets into smaller droplets thereby occurs. The evaporation rate is also thereby increased, which improves blending of the exhaust gas post-treatment agent with the exhaust gas flow. A further result of the oblique orientation of plane E is that fewer droplets can impact that side of enveloping wall 4 which is located oppositely from injection device 7, remain there, and lead to crystalline deposits.

Figure 4:
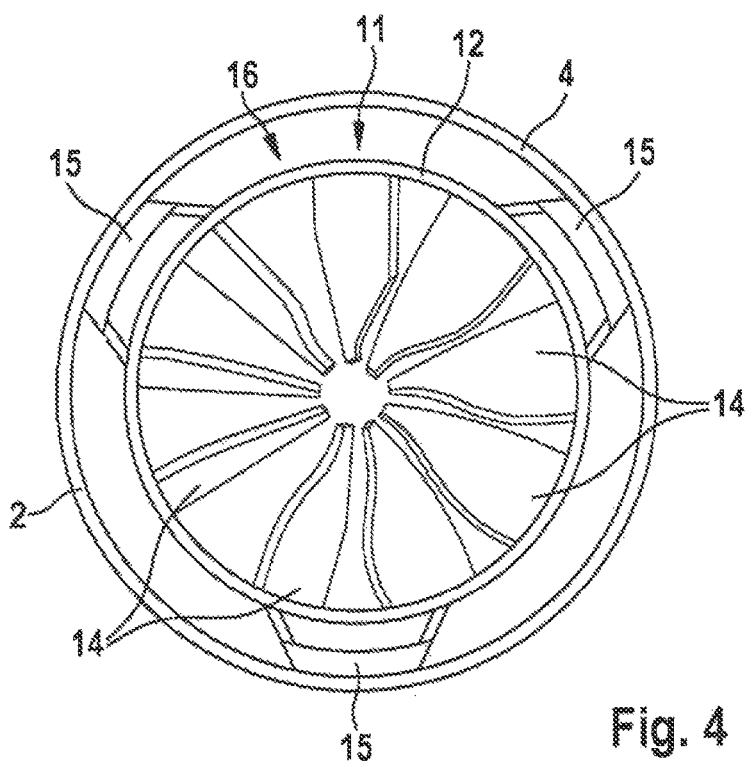
FIG. 4 is a plan view of a second exemplifying embodiment of the mixing apparatus in plan view.

FIG. 4 is a plan view showing a second exemplifying embodiment of mixing apparatus 11. Here as well, air guidance elements 14 are embodied in vane-like fashion and are connected radially externally to tubular element 12. Provision can also be made here that, as described previously, air guidance elements 14 are embodied integrally with the tubular element. Whereas in the first exemplifying embodiment a planar abutment of tubular element 12 against exhaust pipe 2 is provided, according to the exemplifying embodiment of FIG. 4 provision is made that tubular element 12 has multiple spacers 15, disposed with a distribution around the circumference, that project radially outward in order to establish a defined spacing between tubular element 12 and exhaust pipe 2 or its enveloping wall 4. Usefully, at least three spacers 15 are provided. Particularly preferably, spacers 15 are likewise embodied integrally with tubular element 12 and are embodied, for example, as bent-out sheet-metal tongues. Spacers 15 cause the establishment of an annular gap 16 in a radial direction between tubular element 12 and exhaust pipe 2, through which gap the hot exhaust gas of the internal combustion engine flows continuously during operation. Because tubular element 12 is substantially thermally decoupled from enveloping wall 4 of exhaust pipe 2, once heat is introduced into mixing apparatus 11 it is not readily dissipated to exhaust pipe 2. Mixing apparatus 11 is thus constantly heated and results in even better vaporization of the injected exhaust gas post-treatment agent.

Figure 5:
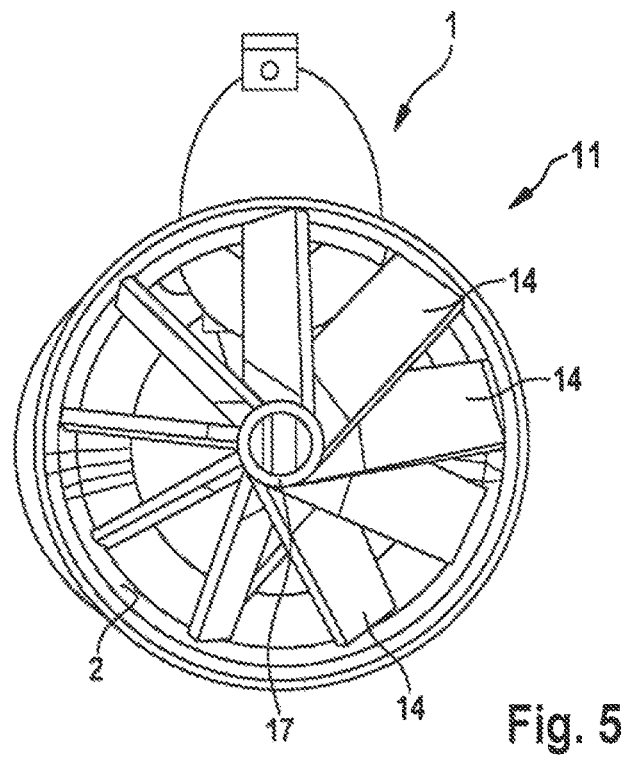
FIG. 5 is a plan view of a third exemplifying embodiment of the mixing apparatus.

FIG. 5 shows a third exemplifying embodiment of mixing apparatus 11, which differs from the preceding exemplifying embodiments substantially only in that air guidance elements 14 are held not radially outwardly but instead radially inwardly on a support element 17 that is embodied in the present case as a tubular element. Air guidance elements 14 extend radially outward to a distance such that a gap remains between air guidance element 14 and enveloping wall 4 of exhaust pipe 2 in order to achieve the thermal decoupling effect described above.

Figure 6:
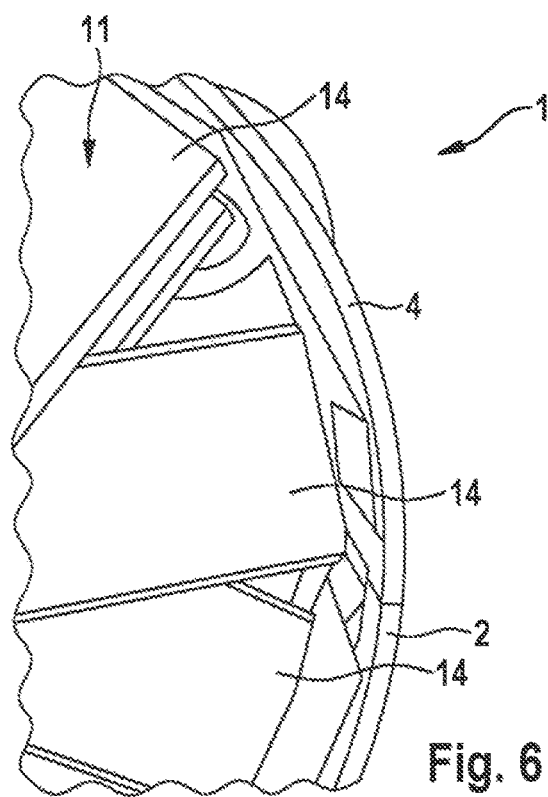
FIG. 6 is a detail view of the mixing apparatus of FIG. 5.

FIG. 6 is an enlarged detail view of mixing apparatus 11 of FIG. 5, in which the gap between enveloping wall 4 and air guidance element 14 is evident.

Figure 7:
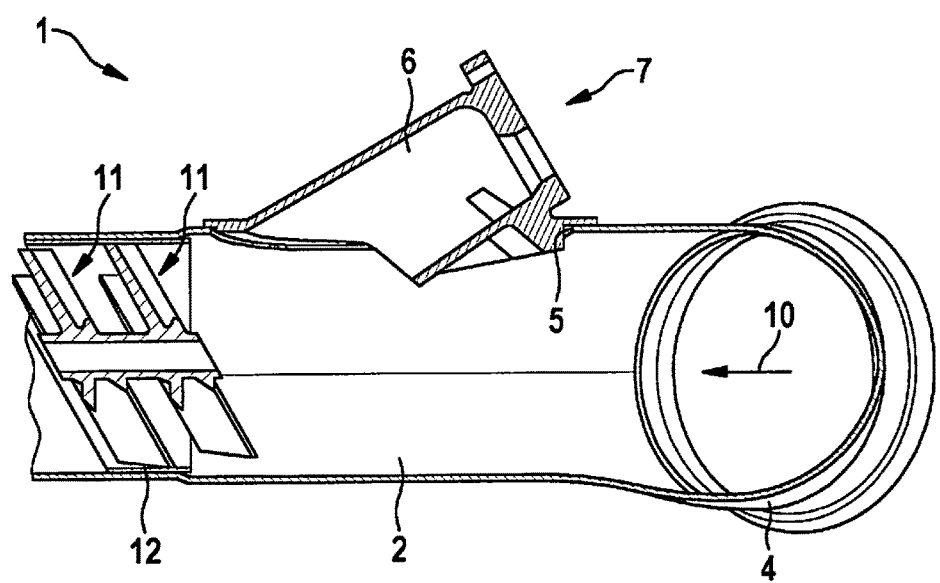
FIG. 7 is a simplified sectioned depiction of the exhaust gas post-treatment device having two mixing apparatuses.

FIG. 6 furthermore shows an optional refinement of exhaust gas post-treatment device 1 in which two mixing apparatuses 11 are is disposed one behind another in exhaust pipe 2. The result is that air guidance elements 14 of two mixing apparatuses 11 are located in exhaust pipe 2 in two planes spaced apart from one another, as shown in FIG. 6. At least the plane of the mixing apparatus located upstream is oriented, as described previously, perpendicularly to the injection direction of injection device 7. The plane in which the air guidance elements of the mixing device located downstream are disposed can be parallel to the plane of the mixing apparatus disposed upstream, as shown in FIG. 7; or also, for example, perpendicularly to longitudinal axis 9 of exhaust pipe 2. Further mixing apparatuses can of course also be provided in correspondingly disposed fashion.

FIG. 7 shows substantially the exhaust gas post-treatment device shown in FIG. 1 in a further longitudinally sectioned depiction. In contrast to the exemplifying embodiment of FIG. 1 provision is now made that, as already mentioned with regard to FIG. 6, two mixing apparatuses 11 are disposed in the pipe or exhaust pipe 2, located one behind another. The advantages already recited result therefrom.

The two mixing apparatuses 11 are disposed in one common tubular element 12 and are preferably embodied integrally with one another as depicted in FIG. 7.

The advantageous exhaust gas post-processing device 1 offers all in all the advantage that impacting of droplets of the exhaust gas post-treatment agent onto the tubular wall opposite injection device 7 is avoided, and vaporization and breakup of the droplets is improved. Thanks to the particular orientation of air guidance elements 14 in the plane E perpendicular to the injection direction, the pressure loss of the mixer is reduced despite the improved mixing properties. This yields a further advantage as compared with conventional mixing apparatuses, in which the pressure loss increases with mixing. The orientation of air guidance elements 14 perpendicular to the injection direction of injection device 7 results in a decrease, as compared with conventional mixers, in the area resulting from projection of the air guidance elements into the plane perpendicular to exhaust pipe axis 9. This leads to a reduction in the counterpressure induced by the mixing apparatus, simultaneously with improved mixing properties.

What is claimed is:

1. An exhaust gas post-treatment device, comprising:
an exhaust pipe, through which a gas flow is guided, the gas flow being an exhaust gas of an internal combustion engine;
an injection device, associated with the pipe, for metered injection of an exhaust gas post-treatment agent into the gas flow; and
at least one mixing apparatus disposed in the pipe downstream from the injection device, each of the at least one mixing apparatus having several air guidance elements disposed in one plane, wherein the plane is oriented perpendicularly to an injection direction of the injection device, and the plane of the guidance elements being oblique to a flow direction of the gas flow in the pipe directly upstream from the mixing apparatus;
wherein the injection direction of the injection device is oblique to a flow direction of the gas flow in the pipe directly upstream from the mixing apparatus; and
wherein the air guidance elements are vanes and are distributed in the pipe radially around a circumference of the exhaust pipe.

2. The exhaust gas post-treatment device as recited in claim 1, wherein the air guidance elements are twisted along their respective radially oriented longitudinal axis.

3. The exhaust gas post-treatment device as recited in claim 1, wherein the air guidance elements are at a radial distance from an enveloping wall of the pipe.

4. The exhaust gas post-treatment device as recited in claim 3, wherein the air guidance elements are disposed on a support element disposed centeredly in the pipe.

5. The exhaust gas post-treatment device as recited in claim 4, wherein the support element is embodied as a tubular element on which the air guidance elements are disposed projecting radially inward.

6. The exhaust gas post-treatment device as recited in claim 4, wherein the support element is embodied as a tubular element on which the air guidance elements are disposed, the air guidance elements projecting from the tubular element and extending outward toward the enveloping wall of the pipe.

7. The exhaust gas post-treatment device as recited in claim 5, wherein the support elements are embodied integrally with the tubular element.

8. The exhaust gas post-treatment device as recited in claim 1, wherein the at least one mixing apparatus includes two mixing apparatuses, the two mixing apparatuses being disposed in the pipe, located one behind another in a flow direction.

* * * * *